(12) United States Patent
Konno et al.

(10) Patent No.: US 11,398,643 B2
(45) Date of Patent: Jul. 26, 2022

(54) ELECTROLYTIC SOLUTION AND ELECTROCHEMICAL DEVICE

(71) Applicant: Showa Denko Materials Co., Ltd., Tokyo (JP)

(72) Inventors: Kaoru Konno, Tokyo (JP); Kumpei Yamada, Tokyo (JP); Ryuichiro Fukuta, Tokyo (JP)

(73) Assignee: Showa Denko Materials Co., Ltd., Tokyo (JP)

( * ) Notice: Subject to any disclaimer, the term of this patent is extended or adjusted under 35 U.S.C. 154(b) by 129 days.

(21) Appl. No.: 16/615,666

(22) PCT Filed: Apr. 3, 2018

(86) PCT No.: PCT/JP2018/014283
§ 371 (c)(1),
(2) Date: Nov. 21, 2019

(87) PCT Pub. No.: WO2018/220997
PCT Pub. Date: Dec. 6, 2018

(65) Prior Publication Data
US 2020/0119399 A1    Apr. 16, 2020

(30) Foreign Application Priority Data

Jun. 1, 2017 (JP) .................... PCT/JP2017/020472
Jun. 1, 2017 (JP) .................... PCT/JP2017/020484

(51) Int. Cl.
*H01M 10/056* (2010.01)
*H01M 10/0567* (2010.01)
(Continued)

(52) U.S. Cl.
CPC .......... *H01M 10/0567* (2013.01); *C07F 7/12* (2013.01); *C07F 7/122* (2013.01); *C07F 7/123* (2013.01);
(Continued)

(58) Field of Classification Search
CPC ......... H01M 10/067; C07F 7/12; C07F 7/122; C07F 7/123
See application file for complete search history.

(56) References Cited

U.S. PATENT DOCUMENTS 3,053,874 A * 9/1962 Pepe .................. C07F 7/12
556/415
8,076,032 B1 * 12/2011 West .................. H01M 10/0567
429/313
(Continued)

FOREIGN PATENT DOCUMENTS

CN      102372732 A    3/2012
CN      102723528 A    10/2012
(Continued)

*Primary Examiner* — Amanda C. Walke
(74) *Attorney, Agent, or Firm* — Faegre Drinker Biddle & Reath LLP

(57) ABSTRACT

The present invention provides, as one aspect, an electrolytic solution comprising a compound represented by the following formula (1) and a compound represented by the following formula (2):

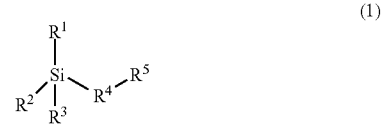

(1)

wherein $R^1$ to $R^3$ each independently represent an alkyl group or a fluorine atom, $R^4$ represents an alkylene group, and $R^5$ represents an organic group comprising a sulfur atom and not comprising a nitrogen atom; and (Continued)

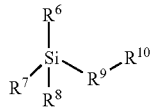

(2)

wherein $R^6$ to $R^8$ each independently represent an alkyl group or a fluorine atom, $R^9$ represents an alkylene group, and $R^{10}$ represents an organic group comprising a nitrogen atom and not comprising a sulfur atom.

12 Claims, 4 Drawing Sheets

(51) Int. Cl.
 C07F 7/18 (2006.01)
 H01G 9/035 (2006.01)
 C07F 7/12 (2006.01)
(52) U.S. Cl.
 CPC ............ C07F 7/1804 (2013.01); H01G 9/035 (2013.01); *H01M 2300/0025* (2013.01)

(56) References Cited

U.S. PATENT DOCUMENTS

| | | | |
|---|---|---|---|
| 9,437,371 B2* | 9/2016 | Pena Hueso | H01G 11/60 |
| 9,466,857 B1 | 10/2016 | Cheng et al. | |
| 10,155,778 B2* | 12/2018 | Syvret | C07F 7/12 |
| 10,273,253 B1* | 4/2019 | Zhou | C07F 7/1892 |
| 10,355,313 B2* | 7/2019 | Pe a Hueso | C07F 7/1804 |
| 10,590,149 B2* | 3/2020 | Syvret | C07F 7/14 |
| 2013/0183576 A1 | 7/2013 | Suguro et al. | |
| 2013/0236777 A1* | 9/2013 | Taki | H01M 10/052 429/200 |
| 2014/0356735 A1 | 12/2014 | Pena Hueso et al. | |
| 2016/0190644 A1 | 6/2016 | Takase et al. | |
| 2016/0308249 A1 | 10/2016 | Johnson et al. | |
| 2017/0301953 A1 | 10/2017 | Pena Hueso et al. | |
| 2018/0034106 A1 | 2/2018 | Schmidt | |
| 2018/0261879 A1* | 9/2018 | Johnson | H01M 10/0525 |
| 2019/0348713 A1* | 11/2019 | Yu | H01M 10/0525 |

FOREIGN PATENT DOCUMENTS

| | | |
|---|---|---|
| CN | 103401019 A | 11/2013 |
| CN | 105037928 A | 11/2015 |
| CN | 105742702 A | 7/2016 |
| CN | 106025358 A | 10/2016 |
| CN | 106795184 A | 5/2017 |
| EP | 3 038 194 A1 | 6/2016 |
| JP | H03-236168 A | 10/1991 |
| JP | 2001-185212 A | 7/2001 |
| JP | 2015-005329 A | 1/2015 |
| JP | 2016-126855 A | 7/2016 |
| KR | 10-2013-0137941 A | 12/2013 |
| WO | WO-2012/029653 A1 | 3/2012 |
| WO | WO-2014/059709 A1 | 4/2014 |
| WO | WO-2016/006488 A1 | 1/2016 |
| WO | WO-2016/054621 A1 | 4/2016 |
| WO | WO-2016/146925 A1 | 9/2016 |

* cited by examiner (a)

(b)

(c)

(b)

(c)

ELECTROLYTIC SOLUTION AND ELECTROCHEMICAL DEVICE

TECHNICAL FIELD

The present invention relates to an electrolytic solution and an electrochemical device.

BACKGROUND ART

In recent years, high-performance electrochemical devices are needed such as non-aqueous electrolytic solution secondary batteries, representative examples including lithium ion secondary batteries, and capacitors, due to the widespread use of portable electronic devices and electric vehicles. As means for improving the performance of an electrochemical device, for example, a method of adding a predetermined additive to an electrolytic solution has been studied. In Patent Literature 1, there is disclosed an electrolytic solution for a non-aqueous electrolytic solution battery which contains a specific siloxane compound in order to improve cycle characteristics and internal resistance characteristics.

CITATION LIST

Patent Literature

Patent Literature 1: Japanese Unexamined Patent Publication No. 2015-005329

SUMMARY OF INVENTION

Technical Problem

In order to increase the durability of such an electrochemical device and use it for a long period of time, it is important to improve the cycle characteristics of the electrochemical device and reduce the resistance as is described in Patent Literature 1. However, in regard to the development of electrochemical devices, there is room for further improvement in terms of improving the cycle characteristics and reducing the resistance.

Then, an object of this invention is to provide an electrolytic solution that can improve the cycle characteristics of an electrochemical device and can also reduce the resistance of the device. In addition, another object of the present invention is to provide an electrochemical device having improved cycle characteristics and a reduced resistance.

Solution to Problem

The present invention provides, as a first aspect, an electrolytic solution comprising a compound represented by the following formula (1) and a compound represented by the following formula (2):

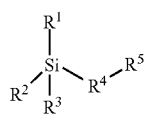

(1)

wherein $R^1$ to $R^3$ each independently represent an alkyl group or a fluorine atom, $R^4$ represents an alkylene group, and $R^5$ represents an organic group comprising a sulfur atom and not comprising a nitrogen atom; and

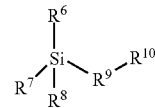

(2)

wherein $R^6$ to $R^8$ each independently represent an alkyl group or a fluorine atom, $R^9$ represents an alkylene group, and $R^{10}$ represents an organic group comprising a nitrogen atom and not comprising a sulfur atom.

In the first aspect, the number of silicon atoms in one molecule of the compound represented by the formula (1) is preferably one.

In the first aspect, $R^5$ is preferably a group represented by any of the following formula (3), formula (4) and formula (5):

(3)

wherein $R^{11}$ represents an alkyl group, and * represents a bond;

(4)

wherein $R^{12}$ represents an alkyl group, and * represents a bond; and

(5)

wherein $R^{13}$ represents an alkyl group, and * represents a bond.

In the first aspect, $R^{10}$ is preferably a group represented by the following formula (6):

(6)

wherein $R^{14}$ and $R^{15}$ each independently represent a hydrogen atom or an alkyl group, and * represents a bond.

In the first aspect, at least one of $R^1$ to $R^3$ is preferably a fluorine atom. In addition, at least one of $R^6$ to $R^8$ is preferably a fluorine atom.

In the first aspect, a total of contents of the compound represented by the formula (1) and the compound represented by the formula (2) is preferably 10% by mass or less based on a total amount of the electrolytic solution.

The present invention provides, as a second aspect, an electrochemical device comprising a positive electrode, a negative electrode and the above electrolytic solution.

The negative electrode preferably comprises a carbon material. The carbon material preferably comprises graphite. The negative electrode preferably further comprises a material comprising at least one element of the group consisting of silicon and tin.

The electrochemical device is preferably a non-aqueous electrolytic solution secondary battery or a capacitor.

Advantageous Effects of Invention

According to the present invention, an electrolytic solution can be provided that can improve cycle characteristics of an electrochemical device and can also reduce the resistance of the device. In addition, according to the present invention, an electrochemical device having improved cycle characteristics and a reduced resistance can be provided.

DESCRIPTION OF EMBODIMENTS

Figure 1:
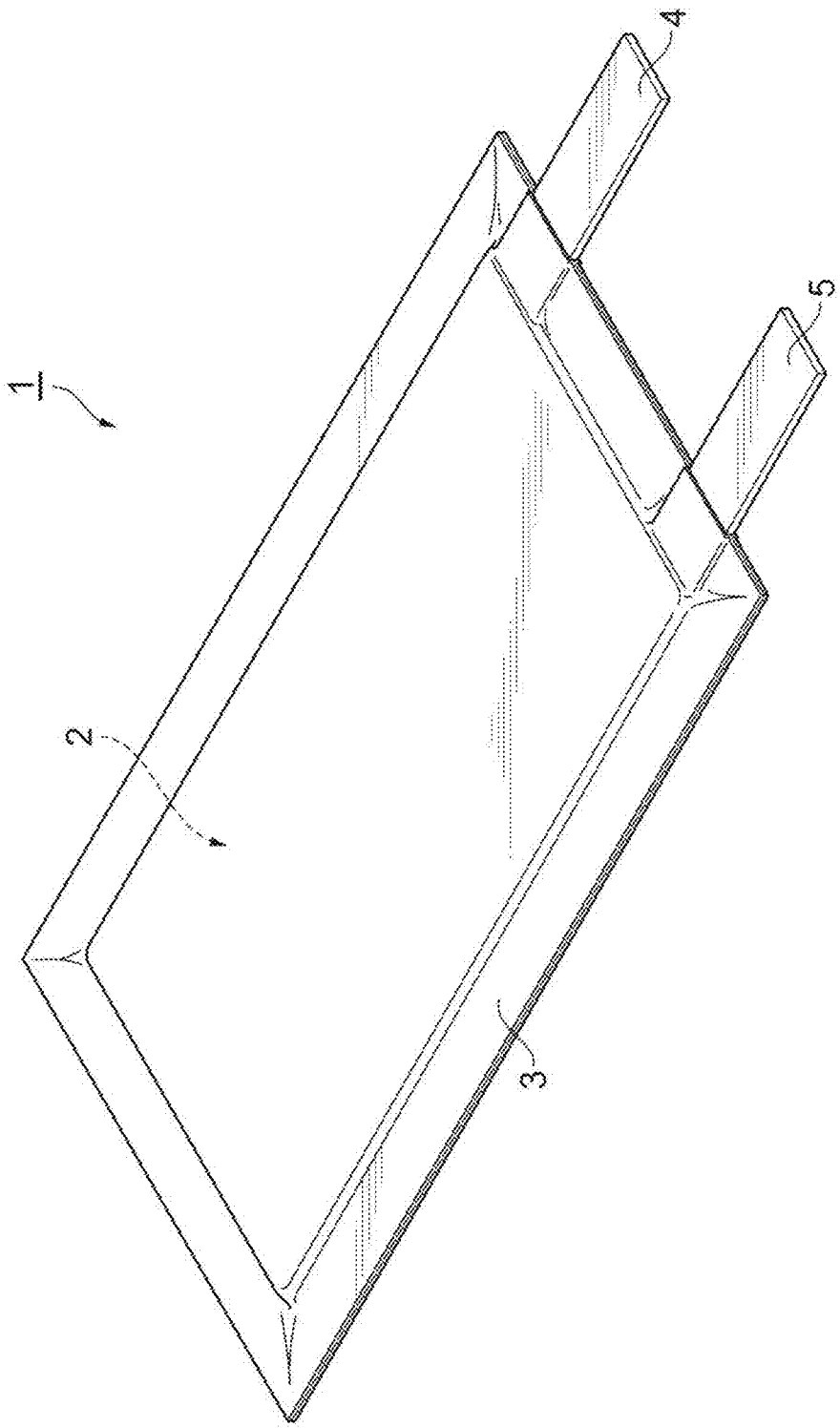
FIG. 1 shows a perspective view showing a non-aqueous electrolytic solution secondary battery which is an electrochemical device according to one embodiment.

Embodiments of the present invention will be described below, appropriately referring to the drawings. However, the present invention is not limited to the following embodiments.

FIG. 1 shows a perspective view showing an electrochemical device according to one embodiment. In the present embodiment, the electrochemical device is a non-aqueous electrolytic solution secondary battery. As shown in FIG. 1, the non-aqueous electrolytic solution secondary battery 1 comprises: an electrode group 2 including a positive electrode, a negative electrode and a separator; and a bag-shaped battery outer package 3 which accommodates the electrode group 2. A positive electrode current collector tab 4 and a negative electrode current collector tab 5 are provided on the positive electrode and the negative electrode, respectively. The positive electrode current collector tab 4 and the negative electrode current collector tab 5 protrude from the inside of the battery outer package 3 to the outside so that the positive electrode and the negative electrode can be electrically connected to the outside of the non-aqueous electrolytic solution secondary battery 1, respectively. The battery outer package 3 is filled with an electrolytic solution (not illustrated). The non-aqueous electrolytic solution secondary battery 1 may be a battery having another shape (coin type, cylindrical type, layered type and the like) than that of the so-called "laminate type" as described above.

The battery outer package 3 may be a container which is formed of, for example, a laminate film. The laminate film may be, for example, a laminated film in which a resin film such as a polyethylene terephthalate (PET) film, a foil of metal such as aluminum, copper and stainless steel, and a sealant layer made from polypropylene or the like are laminated in this order.

Figure 2:
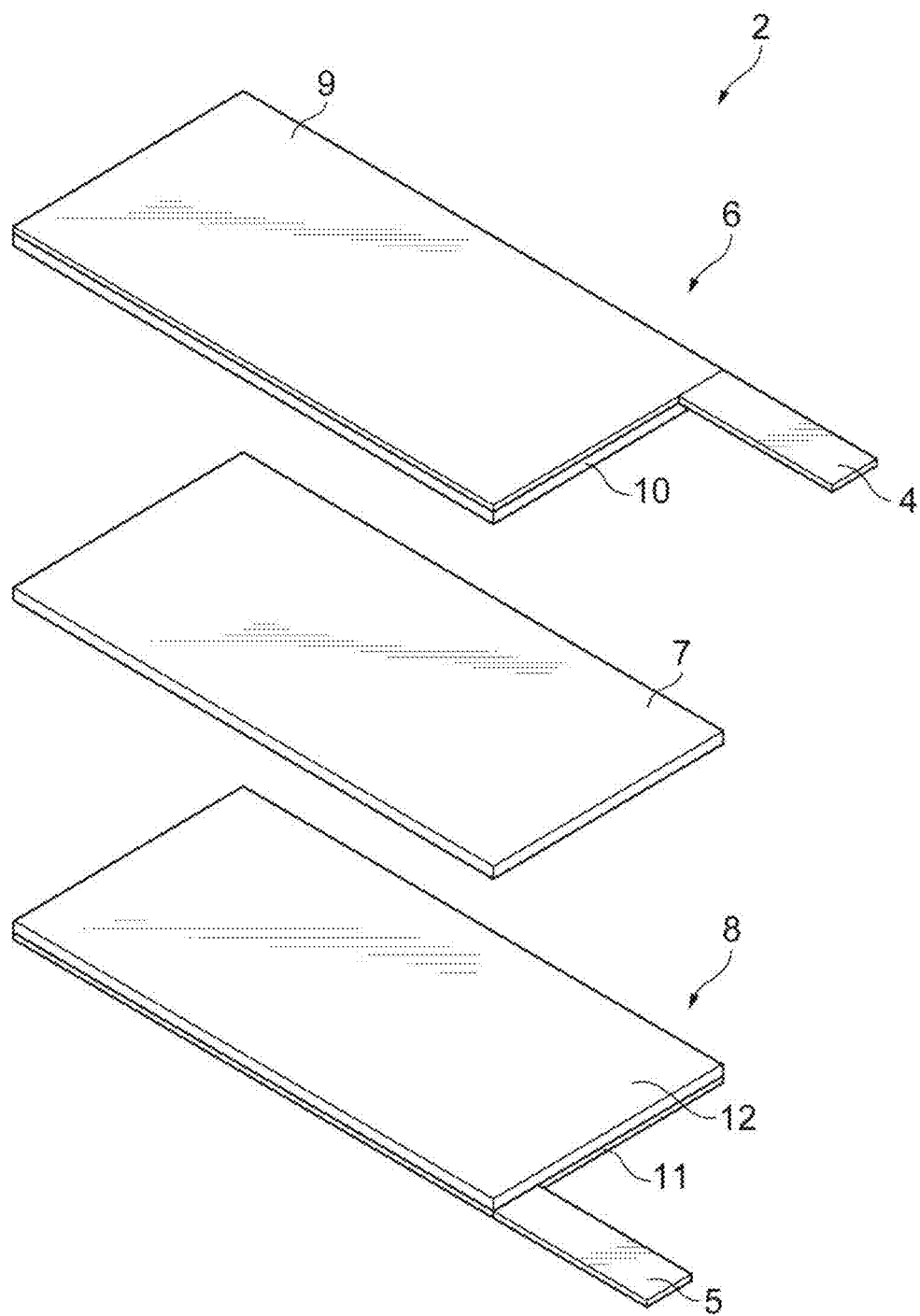
FIG. 2 shows an exploded perspective view showing an electrode group of the secondary battery shown in FIG. 1.

FIG. 2 shows an exploded perspective view showing one embodiment of the electrode group 2 in the non-aqueous electrolytic solution secondary battery 1 shown in FIG. 1. As shown in FIG. 2, the electrode group 2 has a positive electrode 6, a separator 7 and a negative electrode 8, in this order. The positive electrode 6 and the negative electrode 8 are arranged so that a positive electrode mixture layer 10 side and a negative electrode mixture layer 12 side face the separator 7, respectively.

The positive electrode 6 has a positive electrode current collector 9, and a positive electrode mixture layer 10 provided on the positive electrode current collector 9. The positive electrode current collector 9 is provided with the positive electrode current collector tab 4.

The positive electrode current collector 9 is formed from, for example, aluminum, titanium, stainless steel, nickel, baked carbon, an electroconductive polymer, or electroconductive glass. The positive electrode current collector 9 may have a surface of aluminum, copper or the like which has been treated with carbon, nickel, titanium, silver or the like, for the purpose of improving adhesiveness, electroconductivity and oxidation resistance. The thickness of the positive electrode current collector 9 is, for example, 1 to 50 μm from the viewpoint of electrode strength and energy density.

In one embodiment, the positive electrode mixture layer 10 contains a positive electrode active material, an electroconductive agent, and a binder. The thickness of the positive electrode mixture layer 10 is, for example, 20 to 200 μm.

The positive electrode active material may be, for example, lithium oxide. Examples of the lithium oxide include $Li_xCoO_2$, $Li_xNiO_2$, $Li_xMnO_2$, $Li_xCo_yNi_{1-3}O_2$, $Li—Co_yM_{1-y}O_z$, $Li—Ni_{1-y}M_yO_z$, $Li_xMn_2O_4$ and $Li_xMn_{2-3}M_yO_4$ (wherein in each formula, M represents at least one element selected from the group consisting of Na, Mg, Sc, Y, Mn, Fe, Co, Cu, Zn, Al, Cr, Pb, Sb, V and B (provided that M is an element different from the other elements in each formula); and x=0 to 1.2, y=0 to 0.9, and z=2.0 to 2.3). The lithium oxide represented by $Li_xNi_{1-y}M_yO$, may be $Li_xNi_{1-(y1+y2)}Co_{y1}Mn_{y2}O$, or $Li_xNi_{1-(y1+y2)}Co_{y1}Al_{y2}O_z$ (provided that x and z are the same as those described above, and y1=0 to 0.9, y2=0 to 0.9, and y1+y2=0 to 0.9), and may be, for example, $LiNi_{1/3}CO_{1/3}Mn_{1/3}O_2$, $LiNi_{0.5}Co_{0.2}Mn_{0.3}O_2$, $LiNi_{0.6}Co_{0.2}Mn_{0.2}O_2$, $LiNi_{0.8}Co_{0.1}Mn_{0.1}O_2$ or $LiNi_{0.8}CO_{0.15}Al_{0.05}O_2$.

The positive electrode active material may be, for example, lithium phosphate. Examples of the lithium phosphate include lithium manganese phosphate ($LiMnPO_4$), lithium iron phosphate ($LiFePO_4$), lithium cobalt phosphate ($LiCoPO_4$), and lithium vanadium phosphate ($Li_3V_2(PO_4)_3$).

The content of the positive electrode active material may be 80% by mass or more, or 85% by mass or more based on the total amount of the positive electrode mixture layer, and 99% by mass or less.

The electroconductive agent may be carbon materials such as carbon black such as acetylene black and ketjen black, graphite, graphene and a carbon nano-tube. The content of the electroconductive agent may be, for example, 0.01% by mass or more, 0.1% by mass or more, or 1% by mass or more based on the total amount of the positive electrode mixture layer, and may be 50% by mass or less, 30% by mass, or 15% by mass or less.

Examples of the binder include: resins such as polyethylene, polypropylene, polyethylene terephthalate, polymethyl methacrylate, polyimide, aromatic polyamide, cellulose and nitrocellulose; rubbers such as SBR (styrene-butadiene rubber), NBR (acrylonitrile-butadiene rubber), fluorine rubber, isoprene rubber, butadiene rubber and ethylene-propylene rubber; thermoplastic elastomers such as styrene/butadiene/styrene block copolymers or hydrogenated products thereof, EPDM (ethylene/propylene/diene terpolymer), styrene/ethylene/butadiene/ethylene copolymers, and styrene/isoprene/styrene block copolymers or hydrogenated products thereof; soft resins such as syndiotactic-1,2-polybutadiene, polyvinyl acetate, ethylene/vinyl acetate copolymers, and propylene α-olefin copolymers; fluorine-containing resins such as polyvinylidene fluoride (PVDF), polytetrafluoroethylene, fluorinated polyvinylidene fluoride, polytetrafluoroethylene/ethylene copolymers, polytetrafluoroethylene/vinylidene fluoride copolymers; resins having a nitrile group-containing monomer as a monomer unit; and polymer compositions having an ion conductivity of an alkali metal ion (for example, lithium ion).

The content of the binder may be, for example, 0.1% by mass or more, 1% by mass or more, or 1.5% by mass or more based on the total amount of the positive electrode mixture layer, and may be 30% by mass or less, 20% by mass or less, or 10% by mass or less.

The separator 7 is not limited in particular as long as the separator electronically insulates between the positive electrode 6 and the negative electrode 8, and on the other hand, allows ions to pass therethrough, and has resistances to an oxidizing property in the positive electrode 6 side and to a reducing property in the negative electrode 8 side. Examples of the material (quality of material) of the separator 7 include resins and inorganic substances.

The resins include olefin-based polymers, fluorine-based polymers, cellulose-based polymers, polyimide and nylon. The separator 7 is preferably a porous sheet or a nonwoven fabric which is formed from a polyolefin such as polyethylene and polypropylene, from the viewpoint of being stable with respect to the electrolytic solution and excellent in liquid retentivity.

The inorganic substances include: oxides such as alumina and silicon dioxide; nitrides such as aluminum nitride and silicon nitride; and sulfates such as barium sulfate and calcium sulfate. The separator 7 may be, for example, a separator in which a fibrous or particulate inorganic substance is bonded to a thin film substrate such as a nonwoven fabric, a woven fabric and a microporous film.

The negative electrode 8 has a negative electrode current collector 11, and a negative electrode mixture layer 12 provided on the negative electrode current collector 11. The negative electrode current collector 11 is provided with a negative electrode current collector tab 5.

The negative electrode current collector 11 is formed from copper, stainless steel, nickel, aluminum, titanium, baked carbon, an electroconductive polymer, electroconductive glass, an aluminum-cadmium alloy, or the like. The negative electrode current collector 11 may be one in which the surface of copper, aluminum or the like is treated with carbon, nickel, titanium, silver or the like, for the purpose of improving adhesiveness, electroconductivity, and resistance to reduction. The thickness of the negative electrode current collector 11 is, for example, 1 to 50 µm, from the viewpoint of the electrode strength and the energy density.

The negative electrode mixture layer 12 contains, for example, a negative electrode active material and a binder.

The negative electrode active material is not limited in particular as long as the active material is a material which can occlude and release lithium ions. Examples of the negative electrode active material include: carbon materials; metal composite oxides; oxides or nitrides of Group 4 elements such as tin, germanium and silicon; a simple substance of lithium; lithium alloys such as lithium aluminum alloys; and metals which can form an alloy with lithium, such as Sn and Si. The negative electrode active material is preferably at least one selected from the group consisting of the carbon material and the metal composite oxide, from the viewpoint of safety. The negative electrode active material may be one type alone or a mixture of two or more of the materials. The shape of the negative electrode active material may be, for example, a particulate shape.

The carbon materials include: amorphous carbon materials; natural graphite; composite carbon materials in which a film of amorphous carbon material is formed on natural graphite; and artificial graphite (one that is obtained by baking raw materials of resins such as epoxy resin and phenol resin, or pitch-based raw materials which are obtained from petroleum, coal and the like). The metal composite oxide contains one or both of titanium and lithium, and more preferably contains lithium, from the viewpoint of charge/discharge characteristics at high current density.

Among the negative electrode active materials, the carbon materials have high electroconductivity, and are particularly excellent in low temperature characteristics and cycle stability. Among the carbon materials, the graphite is preferable from the viewpoint of increasing the capacity. In the graphite, it is preferable for the interlayer spacing (d002) between carbon network planes in the X-ray wide angle diffraction method to be smaller than 0.34 nm, and is more preferable to be 0.3354 nm or larger and 0.337 nm or smaller. A carbonaceous material which satisfies such conditions is referred to as pseudo-anisotropic carbon, in some cases.

The negative electrode active material may further include a material containing at least one element selected from the group consisting of silicon and tin. The material containing at least one element selected from the group consisting of silicon and tin may be a compound containing at least one element selected from the group consisting of a simple substance of silicon or tin, silicon and tin. The compound may be an alloy containing at least one element selected from the group consisting of silicon and tin, and is, for example, an alloy containing at least one selected from the group consisting of nickel, copper, iron, cobalt, manganese, zinc, indium, silver, titanium, germanium, bismuth, antimony and chromium, in addition to silicon and tin. The compound containing at least one element selected from the group consisting of silicon and tin may be an oxide, a nitride or a carbide, and specifically may be, for example, a silicon oxide such as $SiO$ and $SiO_2$; $Si_3N_4$; $Si_2N_2O$; a silicon carbide such as SiC; LiSiO; SnO; $SnO_2$; or LiSnO.

The negative electrode mixture layer 12 preferably contains a carbon material as a negative electrode active material, more preferably contains graphite, and further preferably contains a mixture of a carbon material and a material containing at least one element selected from the group consisting of silicon and tin, and particularly preferably contains a mixture of graphite and silicon oxide, from the viewpoint of further improving the cycle characteristics of the electrochemical device. A mass ratio of the material containing at least one element selected from the group consisting of silicon and tin (silicon oxide) in the mixture may be 1% by mass or more, or 3% by mass or more, and may be 30% by mass or less.

The content of the negative electrode active material may be 80% by mass or more or 85% by mass or more, and may be 99% by mass or less, based on the total amount of the negative electrode mixture layer.

The binder and its content may be the same as the binder and its content in the positive electrode mixture layer described above.

The negative electrode mixture layer 12 may further contain a thickening agent in order to adjust the viscosity. The thickening agent is not limited in particular, and may be carboxymethyl cellulose, methyl cellulose, hydroxymethyl cellulose, ethyl cellulose, polyvinyl alcohol, oxidized starch, phosphorylated starch, casein, and salts thereof, and the like. The thickening agent may be one type alone or a mixture of two or more of the materials.

In the case where the negative electrode mixture layer 12 contains the thickening agent, the content is not limited in particular. The content of the thickening agent may be 0.1% by mass or more, is preferably 0.2% by mass or more, and is more preferably 0.5% by mass or more, based on the total amount of the negative electrode mixture layer, from the viewpoint of coating properties of the negative electrode mixture layer. The content of the thickening agent may be 5% by mass or less, is preferably 3% by mass or less, and is more preferably 2% by mass or less, based on the total amount of the negative electrode mixture layer, from the viewpoint of suppressing a decrease in battery capacity or an increase in resistance between the negative electrode active materials.

In one embodiment, the electrolytic solution contains a compound represented by the following formula (1), a compound represented by the following formula (2), an electrolyte salt and a non-aqueous solvent,

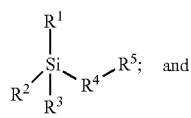
(1)

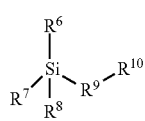
(2)

wherein in the formula (1), $R^1$ to $R^3$ each independently represent an alkyl group or a fluorine atom, $R^4$ represents an alkylene group, and $R^5$ represents an organic group comprising a sulfur atom and not comprising a nitrogen atom; and in the formula (2), $R^6$ to $R^8$ each independently represent an alkyl group or a fluorine atom, $R^9$ represents an alkylene group, and $R^{10}$ represents an organic group comprising a nitrogen atom and not comprising a sulfur atom.

The number of carbon atoms of the alkyl group represented by $R^1$ to $R^3$ may be 1 or more and 3 or less. $R^1$ to $R^3$ may be a methyl group, an ethyl group or a propyl group, and may be any of a straight-chain group and a branched-chain group. At least one of $R^1$ to $R^3$ is preferably a fluorine atom.

The number of carbon atoms of the alkylene group represented by $R^4$ may be 1 or more, or 2 or more, and 5 or less, or 4 or less. The alkylene group represented by $R^4$ may be a methylene group, an ethylene group, a propylene group, a butylene group or a pentylene group, and may be any of a straight-chain group and a branched-chain group.

$R^5$ may be a group represented by the following formula (3) in one embodiment, from the viewpoint of further improving the cycle characteristics of the electrochemical device and further reducing the resistance of the device,

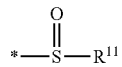
(3)

wherein $R^{11}$ represents an alkyl group, wherein the alkyl group may be the same group as the alkyl group represented by $R^1$ to $R^3$ described above; and * represents a bond.

$R^5$ may be a group represented by the following formula (4) in another embodiment, from the viewpoint of further improving the cycle characteristics of the electrochemical device and further reducing the resistance of the device,

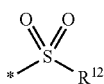
(4)

wherein $R^{12}$ may be an alkyl group, wherein the alkyl group may be the same group as the alkyl group represented by $R^1$ to $R^3$ described above; and * represents a bond.

$R^5$ may be a group represented by the following formula (5) in another embodiment, from the viewpoint of further improving the cycle characteristics of the electrochemical device and further reducing the resistance of the device,

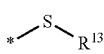
(5)

wherein $R^{13}$ may be an alkyl group, wherein the alkyl group may be the same group as the alkyl group represented by $R^1$ to $R^3$ described above; and * represents a bond.

In one embodiment, the number of silicon atoms in one molecule of the compound represented by the formula (1) is one. In other words, in one embodiment, an organic group represented by $R^5$ does not contain a silicon atom.

In the formula (2), the alkyl group represented by $R^6$ to $R^8$ and the alkylene group represented by $R^9$ may be the same groups as the alkyl group represented by the above $R^1$ to $R^3$ and the alkylene group represented by $R^4$, respectively. At least one of $R^6$ to $R^8$ is preferably a fluorine atom.

In the formula (2), $R^{10}$ may be a group represented by the following formula (6) in one embodiment, from the viewpoint of further improving the cycle characteristics of the electrochemical device, improving a low-temperature input characteristics of the device, and further reducing the resistance of the device,

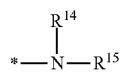
(6)

wherein $R^{14}$ and $R^{15}$ each independently represent a hydrogen atom or an alkyl group, wherein the alkyl group represented by $R^{14}$ or $R^{15}$ may be the same group as the alkyl group represented by $R^1$ to $R^3$ described above; and * represents a bond.

In one embodiment, the number of silicon atoms in one molecule of the compound represented by the formula (2) is one. In other words, in one embodiment, an organic group represented by $R^{10}$ does not contain a silicon atom.

The electrolytic solution contains a compound represented by the above formula (1) and a compound represented by the formula (2). In one embodiment, the electrolytic solution may contain: a compound represented by the formula (1) in which $R^5$ is a compound that is a group represented by any of the formula (3), the formula (4) and the formula (5); and a compound represented by the formula (2). In another embodiment, the electrolytic solution may contain a compound represented by the formula (1), and a compound represented by the formula (2) in which $R^{10}$ is a group represented by the formula (6). In another embodiment, the electrolytic solution may contain a compound represented by the formula (1) in which $R^5$ is a group represented by the formula (3), and a compound represented by the formula (2) in which $R^{10}$ is a group represented by the formula (6); may contain a compound represented by the formula (1) in which $R^5$ is a group represented by the formula (4), and a compound represented by the formula (2) in which $R^{10}$ is a group represented by the formula (6); and may contain a compound represented by the formula (1) in which $R^5$ is a group represented by the formula (5), and a compound represented by the formula (2) in which $R^{10}$ is represented by the formula (6).

A content of the total of the compound represented by the formula (1) and the compound represented by the formula (2) is preferably 0.001% by mass or more, 0.005% by mass or more, or 0.01% by mass or more, based on a total amount of the electrolytic solution, and is preferably 10% by mass or less, 7% by mass or less, 5% by mass or less, 3% by mass or less, 2% by mass or less, 1.5% by mass or less, or 1% by mass or less, from the viewpoint of further improving the cycle characteristics of the electrochemical device and further reducing the resistance. The content of the total of the compound represented by the formula (1) and the compound represented by the formula (2) is preferably 0.001 to 10% by mass, 0.001 to 7% by mass, 0.001 to 5% by mass, 0.001 to 3% by mass, 0.001 to 2% by mass, 0.001 to 1.5% by mass, 0.001 to 1% by mass, 0.005 to 10% by mass, 0.005 to 7% by mass, 0.005 to 5% by mass, 0.005 to 3% by mass, 0.005 to 2% by mass, 0.005 to 1.5% by mass, 0.005 to 1% by mass, 0.01 to 10% by mass, 0.01 to 7% by mass, 0.01 to 5% by mass, 0.01 to 3% by mass, 0.01 to 2% by mass, 0.01 to 1.5% by mass, or 0.01 to 1% by mass, based on the total amount of the electrolytic solution, from the same viewpoint.

A content of the compound represented by the formula (1) may be, for example, 0.001% by mass or more, 0.005% by mass or more, or 0.01% by mass or less, based on a total amount of the electrolytic solution, and may be 8% by mass or less, 5% by mass or less, or 3% by mass or less, from the viewpoint of further improving the cycle characteristics of the electrochemical device and further reducing the resistance of the device.

A content of the compound represented by the formula (2) may be, for example, 0.001% by mass or more, 0.005% by mass or more, or 0.01% by mass or less, based on a total amount of the electrolytic solution, and may be 5% by mass or less, 3% by mass or less, or 1% by mass or less, from the viewpoint of further improving the cycle characteristics of the electrochemical device and further reducing the resistance of the device.

A ratio of the content of the compound represented by the formula (1) to the content of the compound represented by the formula (2) (content of compound represented by formula (1)/content of compound represented by formula (2)) is preferably 0.01 or more, 0.05 or more, 0.1 or more, 1 or more, or 2 or more, and in addition, is preferably 100 or less, more preferably 50 or less, and further preferably 10 or less, from the viewpoint of further improving the cycle characteristics of the electrochemical device and further reducing the resistance.

The electrolyte salt may be a lithium salt, for example. Examples of the lithium salt may be at least one selected from the group consisting of $LiPF_6$, $LiBF_4$, LiFSI (lithium bisfluorosulfonylimide), LiTFSI (lithium bistrifluoromethane sulfonylimide), $LiClO_4$, $LiB(C_6H_5)_4$, $LiCH_3SO_3$, $LiCF_3SO_3$, $LiN(SO_2F)_2$, $LiN(SO_2CF_3)_2$ and $LiN(SO_2CF_2CF_3)_2$. The lithium salt preferably contains $LiPF_6$, from the viewpoint of further being excellent in solubility to a solvent, and in charge/discharge characteristics, output characteristics, cycle characteristics and the like of a secondary battery.

The concentration of the electrolyte salt is preferably 0.5 mol/L or higher, is more preferably 0.7 mol/L or higher, is further preferably 0.8 mol/L or higher, based on the total amount of the non-aqueous solvent, and is preferably 1.5 mol/L or lower, is more preferably 1.3 mol/L or lower, and is further preferably 1.2 mol/L or lower, from the viewpoint of being excellent in the charge/discharge characteristics.

The examples of the non-aqueous solvent include ethylene carbonate, propylene carbonate, dimethyl carbonate, diethyl carbonate, methyl ethyl carbonate, 7-butyl lactone, acetonitrile, 1,2-dimethoxyethane, dimethoxymethane, tetrahydrofuran, dioxolane, methylene chloride, and methyl acetate. The non-aqueous solvent may be one type alone or a mixture of two or more of these solvents, and is preferably the mixture of two or more.

The electrolytic solution may further contain other materials than the compound represented by the formula (1), the compound represented by the formula (2), the electrolyte salt and the non-aqueous solvent. Other materials may be, for example, a heterocyclic compound containing nitrogen, sulfur, or nitrogen and sulfur, a cyclic carboxylic acid ester, a fluorine-containing cyclic carbonate, other compounds having an unsaturated bond in a molecule, or the like.

The present inventors have studied compounds which have various structures and functional groups, and as a result, the present inventors have revealed that the cycle characteristics of the non-aqueous electrolytic solution secondary battery 1 have been remarkably improved and the resistance of the battery has been reduced, by application of the above electrolytic solution. The present inventors assume the effects of using the above electrolytic solution to be as follows. The compound represented by the formula (1) and the compound represented by the formula (2) form a stable film on the positive electrode or the negative electrode. Thereby, the lowering of the output characteristics can be suppressed, which originates in the deposition of a decomposed product of the electrolytic solution on the positive electrode or the negative electrode. Furthermore, the lowering of the capacity and the increase of the resistance are suppressed, which originate in the decomposition of the electrolyte salt. As a result, the cycle characteristics of the non-aqueous electrolytic solution secondary battery 1 are improved and the resistance of the battery is reduced. Furthermore, the compound represented by the formula (1) and the compound represented by the formula (2) themselves have a skeleton containing Si, and thereby generation of gas derived from the compound is reduced, and the volume expansion can be suppressed which occurs when the non-aqueous electrolytic solution secondary battery 1 is stored at high temperature.

Subsequently, a method for manufacturing the non-aqueous electrolytic solution secondary battery 1 will be described. The method for manufacturing the non-aqueous electrolytic solution secondary battery 1 includes: a first step of obtaining the positive electrode 6; a second step of obtaining the negative electrode 8; a third step of accommodating the electrode group 2 in the battery outer package 3; and a fourth step of injecting an electrolytic solution into the battery outer package 3.

In the first step, the positive electrode 6 is obtained by: dispersing a material to be used for the positive electrode mixture layer 10 in a dispersion medium by using a kneader, a disperser or the like to obtain a slurry-like positive electrode mixture; then applying the positive electrode mixture onto the positive electrode current collector 9 by a doctor blade method, a dipping method, a spray method or the like; and then volatilizing the dispersion medium. After volatilization of the dispersion medium, a step of compression molding using a roll press may be provided as needed. The above steps from the application of the positive electrode mixture to the volatilization of the dispersion medium may be performed a plurality of times, and thereby the positive electrode mixture layer 10 may be formed as a positive electrode mixture layer having a multilayer structure. The dispersion medium may be water, 1-methyl-2-pyrrolidone (hereinafter also referred to as NMP), or the like.

The second step may be the same step as the first step described above, and the method of forming the negative electrode mixture layer 12 on the negative electrode current collector 11 may be the same method as the first step described above.

In the third step, the separator 7 is sandwiched between the produced positive electrode 6 and negative electrode 8, and the electrode group 2 is formed. Next, the electrode group 2 is accommodated in the battery outer package 3.

In the fourth step, the electrolytic solution is injected into the battery outer package 3. The electrolytic solution can be prepared, for example, by firstly dissolving an electrolyte salt in a solvent, and then dissolving other materials thereinto.

As for another embodiment, the electrochemical device may be a capacitor. The capacitor may include, similarly to the non-aqueous electrolytic solution secondary battery 1 described above, the electrode group including the positive electrode, the negative electrode and the separator, and a bag-shaped battery outer package which accommodates the electrode group. The details of each component in the capacitor may be the same as those of the non-aqueous electrolytic solution secondary battery 1.

EXAMPLES

The present invention will be specifically described below with reference to Examples, but the present invention is not limited to these Examples.

Example 1

[Production of Positive Electrode]

Fibrous graphite (1% by mass) and acetylene black (AB) (1% by mass) of electroconductive agents, and a binder (3% by mass) were sequentially added to and mixed with lithium cobaltate (95% by mass) of a positive electrode active material. To the obtained mixture, NMP of a dispersion medium was added, the resultant mixture was kneaded, and thereby a slurry-like positive electrode mixture was prepared. A predetermined amount of this positive electrode mixture was evenly and uniformly applied to an aluminum foil which was a positive electrode current collector and had a thickness of 20 µm. After that, the dispersion medium was volatilized, then the resultant mixture was compressed to a density of 3.6 g/cm$^3$ by pressing, and a positive electrode was obtained.

[Production of Negative Electrode]

A binder and carboxymethylcellulose of a thickening agent were added to graphite and silicon oxide of the negative electrode active material. Mass ratios among the materials were set to be graphite:silicon oxide:binder:thickening agent=92:5:1.5:1.5. To the obtained mixture, water was added as a dispersion medium, and the mixture was kneaded to prepare a slurry-like negative electrode mixture. A predetermined amount of this negative electrode mixture was evenly and uniformly applied to a rolled copper foil which was a negative electrode current collector and had a thickness of 10 µm. After that, the dispersion medium was volatilized, then the resultant mixture was compressed to a density of 1.6 g/cm$^3$ by pressing, and a negative electrode was obtained.

[Production of Lithium Ion Secondary Battery]

The positive electrode which was cut into a 13.5 cm$^2$ square was sandwiched by polyethylene porous sheets (trade name: Hypore (registered trademark), manufactured by Asahi Kasei Corporation and thickness of 30 µm) which were separators; then, the negative electrode which was cut into a 14.3 cm$^2$ square was further overlapped thereon; and an electrode group was produced. This electrode group was accommodated in a container (battery outer package) formed of a laminate film made from aluminum (trade name: aluminum laminate film, manufactured by Dai Nippon Printing Co., Ltd.). Subsequently, 1 mL of an electrolytic solution was added into the container, the container was heat-welded, and the lithium ion secondary battery for evaluation was produced. As the electrolytic solution, a solution was used which was prepared by adding 1% by mass of vinylene carbonate (VC), 0.45% by mass of a compound A represented by the following formula (7), and 0.05% by mass of a compound B represented by the following formula (8), with respect to the total amount of the following mixed solution, into the mixed solution which contained ethylene carbonate containing 1 mol/L of LiPF$_6$, dimethyl carbonate and diethyl carbonate:

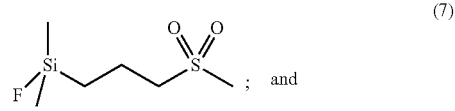

(7)

; and

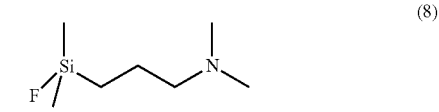

(8)

Example 2

A lithium ion secondary battery was produced in the same manner as in Example 1, except that the content of the compound A was changed to 0.25% by mass, and the content of the compound B was changed to 0.25% by mass, in Example 1, based on the total amount of the electrolytic solution.

Example 3

A lithium ion secondary battery was produced in the same manner as in Example 1, except that the content of the compound A was changed to 0.05% by mass, and the content of the compound B was changed to 0.45% by mass, in Example 1, based on the total amount of the electrolytic solution.

Comparative Example 1

A lithium ion secondary battery was produced in the same manner as in Example 1, except that the compound A and the compound B were not used in Example 1.

Reference Example 1

A lithium ion secondary battery was produced in the same manner as in Example 1, except that the compound B was not used and the content of the compound A was changed to 0.50% by mass, in Example 1.

Reference Example 2

A lithium ion secondary battery was produced in the same manner as in Example 1, except that the compound A was not contained and the content of the compound B was changed to 0.50% by mass, in Example 1.

[Initial Charge/Discharge]

The produced lithium ion batteries were subjected to the initial charge/discharge by the following method. Firstly, constant current charge was performed up to an upper limit voltage of 4.2 V at a current value of 0.1 C in an environment of 25° C., and then constant-voltage charge was performed at 4.2 V. The charge termination condition was set at a current value of 0.01 C. After that, constant current discharge was performed at a current value of 0.1 C to a final voltage of 2.5 V. This charge/discharge cycle was repeated three times ("C" used as a unit of current value means "current value (A)/battery capacity (Ah)").

[Evaluation of Cycle Characteristics]

After the initial charge/discharge, the cycle characteristics of each of the secondary batteries in Examples 1 to 3, Comparative Example 1 and Reference Examples 1 to 2 were evaluated by a cycle test in which the charge/discharge was repeated. As for a charging pattern, the secondary batteries of Examples 1 to 3, Comparative Example 1 and Reference Examples 1 to 2 were subjected to the constant current charge at a current value of 0.5 C up to an upper limit voltage of 4.2 V, and then were subjected to the constant-voltage charge at 4.2 V, in an environment of 45° C. The charge termination condition was set at a current value of 0.05 C. As for discharge, the constant current discharge was performed at 1 C up to 2.5 V, and the discharge capacity was determined. This series of charge/discharge was repeated 300 cycles, and the discharge capacity was measured each time of the charge/discharge. The discharge capacity after the charge/discharge in the first cycle in Comparative Example 1 was determined to be 1, and relative values of the discharge capacities (ratio of discharge capacity) in Examples 1 to 3 and Reference Examples 1 to 2 in each cycle were determined. FIGS. 3(a) to 3(c) show the relationship between the number of cycles and the relative values of the discharge capacities. The results of Examples 1 to 3 are shown in FIGS. 3(a) to 3(c), respectively; and the results of Comparative Example 1 and Reference Examples 1 to 2 are shown in FIGS. 3(a) to 3(c), for comparison. The ratio of discharge capacity after 300 cycles was 0.819 in Comparative Example 1, 0.855 in Reference Example 1, and 0.865 in Reference Example 2, whereas the ratio was 0.877 in Example 1, 0.874 in Example 2, and 0.875 in Example 3.

[Resistance Evaluation by AC Impedance Measurement]

The resistances of the lithium ion secondary batteries of Examples 1 to 3 and Comparative Example 1 were evaluated by AC impedance measurement. Specifically, the produced lithium ion batteries were subjected to the constant current charge at a current value of 0.1 C up to the upper limit voltage of 4.2 V in an environment of 25° C., and were each subsequently subjected to the constant-voltage charge at 4.2 V. The charge termination condition was set at a current value of 0.01 C. For these lithium ion secondary batteries, resistances were measured with the use of an AC impedance measuring device (1260 type, manufactured by Solartron Analytical) in a frequency range of 20 mHz to 200 kHz with an amplitude of 10 mV in an environment of 25° C. The measurement results are shown in FIGS. 4(a) to 4(c). Note that the results of Examples 1 to 3 are shown in FIGS. 4(a) to 4(c), respectively, and that the results of Comparative Example 1 are shown in FIGS. 3(a) to 3(c), for comparison.

Figure 3:
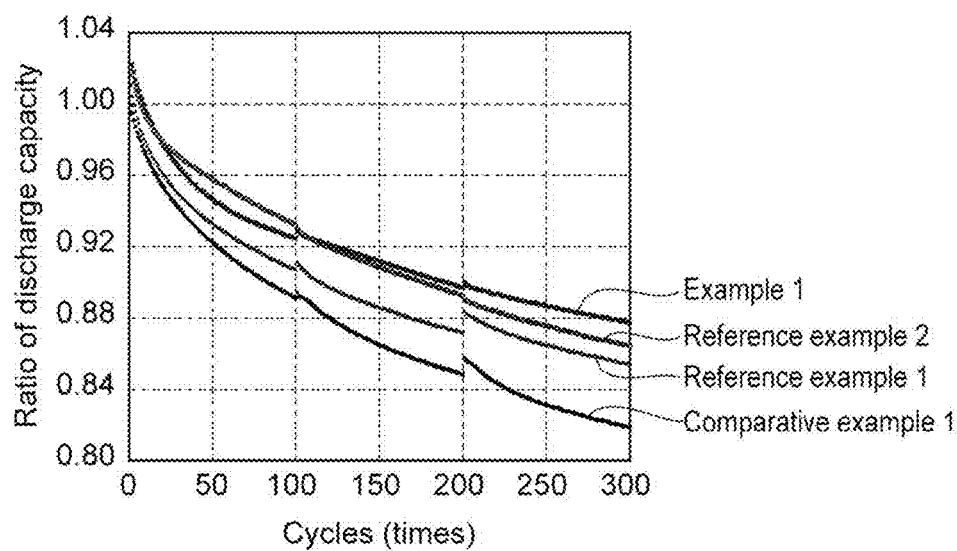
FIG. 3 shows a graph showing evaluation results of cycle characteristics of Examples 1 to 3, Comparative Example 1 and Reference Examples 1 to 2.
Figure 3:
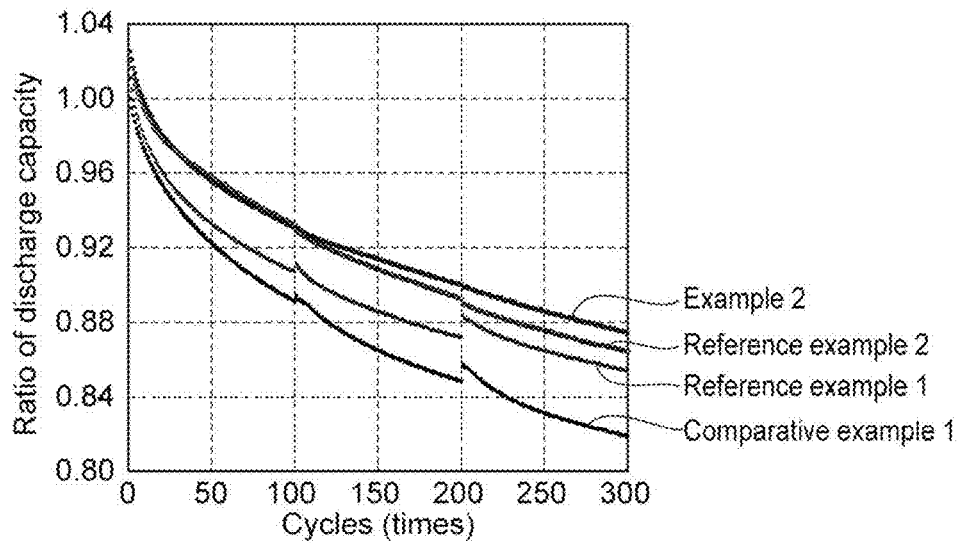
Figure 3:
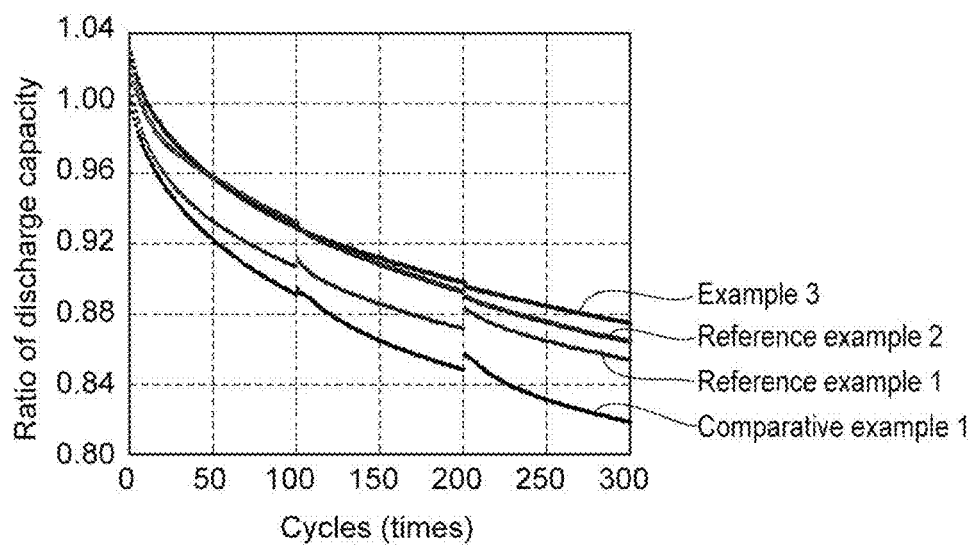

As shown in FIG. 3, in the case where a negative electrode was used which contained graphite and silicon oxide as a negative electrode active material, in the lithium ion secondary battery of Reference Example 1, to which an electrolytic solution containing 0.50% by mass of the compound A was applied, and in the lithium ion secondary battery of Reference Example 2, to which an electrolytic solution containing 0.50% by mass of the compound B was applied, the evaluation of the cycle characteristics was satisfactory, as compared with the lithium ion secondary battery of Comparative Example 1 which did not contain the compound A and the compound B. On the other hand, in the lithium ion secondary batteries of Examples 1 to 3, to which an electrolytic solution containing both the compound A and the compound B was applied, the evaluation of the cycle characteristics was further satisfactory, as compared with the lithium ion secondary batteries of Comparative Example 1 and Reference Examples 1 to 2. The mechanism by which these cycle characteristics were improved is not necessarily clear, but the reason is considered to be because the film was formed by the addition of the compound A and the compound B, the film being stable on the positive electrode or the negative electrode and having a satisfactory ion-conductivity; the decomposition of the electrolytic solution was suppressed, which accompanied it; and furthermore, the decomposition of $LIPF_6$ was suppressed by an interaction between the compound A and the compound B and the lithium salt ($LIPF_6$).

Figure 4:
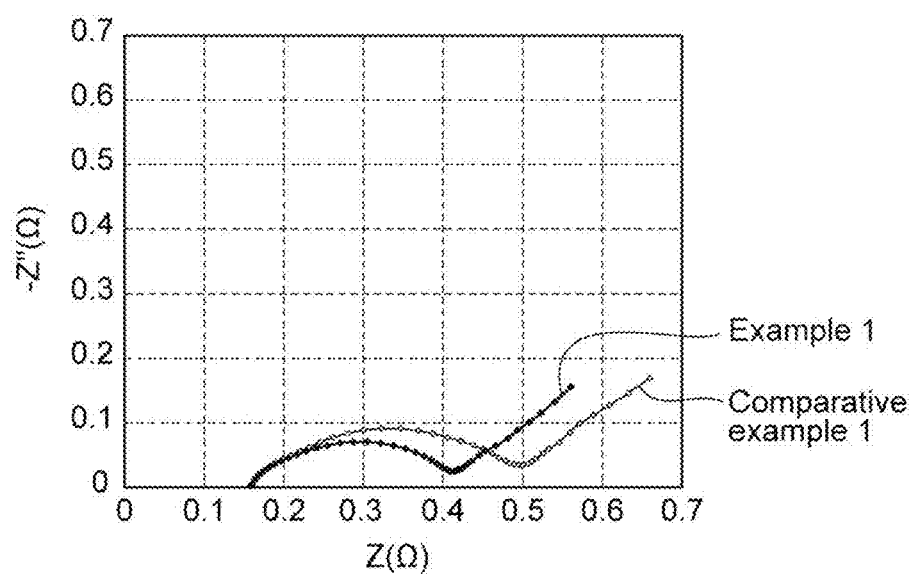
FIG. 4 shows a graph showing evaluation results of AC impedance measurement of Examples 1 to 3 and Comparative Example 1.
Figure 4:
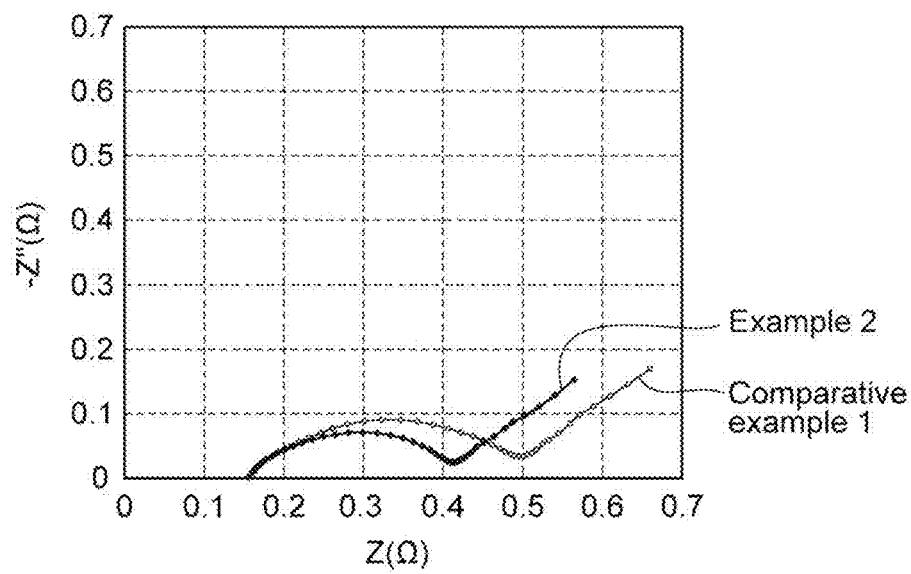
Figure 4:
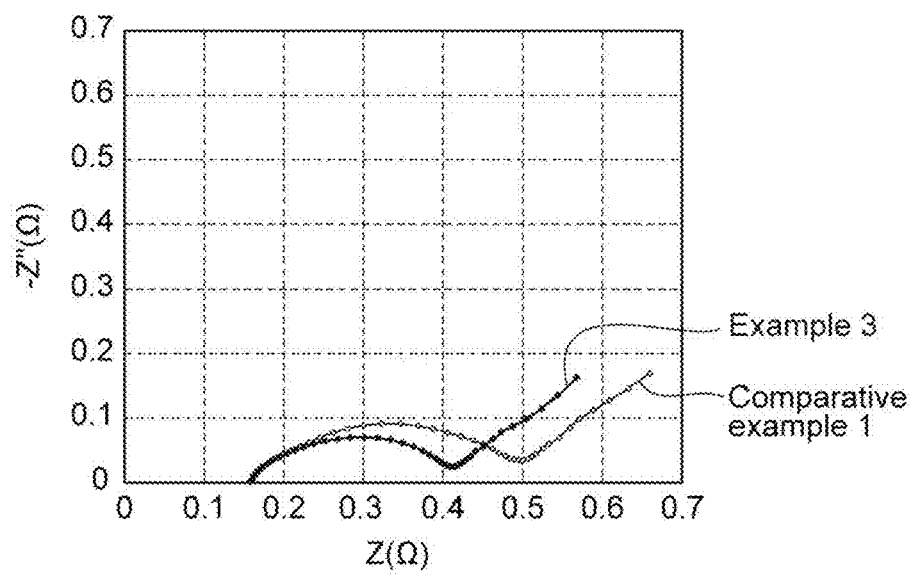

In addition, as is shown in FIG. 4, it has become clear that in the lithium ion secondary batteries of Examples 1 to 3, to which the electrolytic solution containing both the compound A and the compound B was applied, the impedance (resistance) at 25° C. was low, as compared with the lithium ion secondary battery of Comparative Example 1. The mechanism by which these characteristics were improved is not necessarily clear, but the reason is considered to be because the film was formed by the addition of the compounds A and B, the film being stable on the positive electrode or the negative electrode and having a satisfactory ion-conductivity, and because by the interaction between the compounds A and B and the lithium ion, the lithium salt ($LIPF_6$) was stabilized, or activation energy for desolvation of lithium decreased.

REFERENCE SIGNS LIST

1 . . . Non-aqueous electrolytic solution secondary battery (electrochemical device), 6 . . . Positive electrode, 7 . . . Separator, 8 . . . Negative electrode.

The invention claimed is:

1. An electrolytic solution comprising a compound represented by the following formula (1) and a compound represented by the following formula (2):

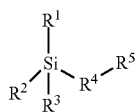
(1)

wherein $R^1$ to $R^3$ each independently represent an alkyl group or a fluorine atom, $R^4$ represents an alkylene group, and $R^5$ represents an organic group comprising a sulfur atom and not comprising a nitrogen atom; and

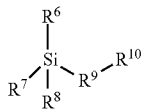
(2)

wherein $R^6$ to $R^8$ each independently represent an alkyl group or a fluorine atom, $R^9$ represents an alkylene group, and $R^{10}$ represents an organic group comprising a nitrogen atom and not comprising a sulfur atom.

2. The electrolytic solution according to claim 1, wherein a number of silicon atoms in one molecule of the compound represented by the formula (1) is one.

3. The electrolytic solution according to claim 1, wherein $R^5$ is a group represented by any of the following formula (3), formula (4) and formula (5):

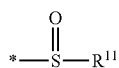
(3)

wherein $R^{11}$ represents an alkyl group, and * represents a bond;

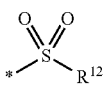
(4)

wherein $R^{12}$ represents an alkyl group, and * represents a bond; and

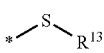
(5)

wherein $R^{13}$ represents an alkyl group, and * represents a bond.

4. The electrolytic solution according to claim 1, wherein $R^{10}$ is a group represented by the following formula (6):

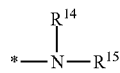
(6)

wherein $R^{14}$ and $R^{15}$ each independently represent a hydrogen atom or an alkyl group, and * represents a bond.

5. The electrolytic solution according to claim 1, wherein at least one of $R^1$ to $R^3$ is a fluorine atom.

6. The electrolytic solution according to claim 1, wherein at least one of $R^6$ to $R^8$ is a fluorine atom.

7. An electrolytic solution comprising a compound represented by the following formula (1) and a compound represented by the following formula (2):

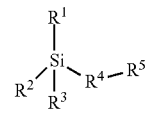
(1)

wherein $R^1$ to $R^3$ each independently represent an alkyl group or a fluorine atom, $R^4$ represents an alkylene group, and $R^5$ represents an organic group comprising a sulfur atom and not comprising a nitrogen atom; and

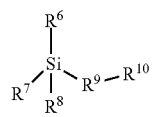
(2)

wherein $R^6$ to $R^8$ each independently represent an alkyl group or a fluorine atom, $R^9$ represents an alkylene group, and $R^{10}$ represents an organic group comprising a nitrogen atom and not comprising a sulfur atom, wherein a total of contents of the compound represented by the formula (1) and the compound represented by the formula (2) is 10% by mass or less based on a total amount of the electrolytic solution.

8. An electrochemical device comprising:
a positive electrode;
a negative electrode; and
the electrolytic solution according to claim 1.

9. The electrochemical device according to claim 8, wherein the negative electrode comprises a carbon material.

10. The electrochemical device according to claim 9, wherein the carbon material comprises graphite.

11. The electrochemical device according to claim 9, wherein the negative electrode further comprises a material comprising at least one element of the group consisting of silicon and tin.

12. The electrochemical device according to claim 8, wherein the electrochemical device is a non-aqueous electrolytic solution secondary battery or a capacitor.

* * * * *